US009669345B2

(12) United States Patent
Esswein et al.

(10) Patent No.: US 9,669,345 B2
(45) Date of Patent: Jun. 6, 2017

(54) SYSTEMS AND METHODS FOR CONTROLLING PARTICULATE RELEASE FROM LARGE EQUIPMENT

(71) Applicant: The United States of America, as Represented by the Secretary, Department of Health and Human Services, Washington, DC (US)

(72) Inventors: Eric J. Esswein, Conifer, CO (US); Michael Breitenstein, Cincinnati, OH (US); John E. Snawder, Williamstown, KY (US); Michael Gerard Gressel, Cincinnati, OH (US); Jerry L. Kratzer, Cincinnati, OH (US)

(73) Assignee: The United States of America, as represented by the Secretary, Department of Health and Human Services, Washington, DC (US)

(*) Notice: Subject to any disclaimer, the term of this patent is extended or adjusted under 35 U.S.C. 154(b) by 0 days.

(21) Appl. No.: 14/992,963

(22) Filed: Jan. 11, 2016

(65) Prior Publication Data
US 2016/0121252 A1    May 5, 2016

Related U.S. Application Data

(62) Division of application No. 13/802,265, filed on Mar. 13, 2013, now abandoned.

(60) Provisional application No. 61/673,658, filed on Jul. 19, 2012.

(51) Int. Cl.
*B01D 46/00*    (2006.01)
*B01D 46/02*    (2006.01)
*B01D 46/42*    (2006.01)

(52) U.S. Cl.
CPC ......... *B01D 46/02* (2013.01); *B01D 46/4272* (2013.01); *B01D 2275/203* (2013.01); *Y10T 29/4987* (2015.01); *Y10T 29/49826* (2015.01)

(58) Field of Classification Search
CPC .... B01D 46/00; B01D 46/02; B01D 46/4272; B01D 2275/203; Y10T 29/4987; Y10T 29/49826
USPC ............ 55/304, 378, 381, 495; 29/428, 450
See application file for complete search history.

(56) References Cited

U.S. PATENT DOCUMENTS

| | | | |
|---|---|---|---|
| 3,401,867 A | 9/1968 | Long et al. | |
| 3,756,469 A * | 9/1973 | Clark | B61D 3/06 105/243 |
| 4,003,727 A | 1/1977 | O'Dell | |
| 4,017,281 A | 4/1977 | Johnstone | |
| 4,246,014 A | 1/1981 | Wright et al. | |
| 4,546,896 A * | 10/1985 | Reid | B65D 88/005 220/1.5 |
| 4,865,488 A | 9/1989 | Huston et al. | |
| 4,904,126 A | 2/1990 | Voith | |

(Continued)

*Primary Examiner* — T. Bennett McKenzie
(74) *Attorney, Agent, or Firm* — Klarquist Sparkman, LLP (57) ABSTRACT

A containment system for reducing the release of harmful respirable particles through surface openings in equipment that carries sand includes a filter-receiving member configured to be coupled over an opening in a surface of the equipment and a filter member configured to be coupled to the filter-receiving member. The filter-receiving member can have a first side, a second side, and a passageway extending from the first side to the second side. The filter can have a porosity that permits air to flow through the filter member and restricts the flow of solid particulates.

11 Claims, 10 Drawing Sheets

(56) References Cited

U.S. PATENT DOCUMENTS

| | | |
|---|---|---|
| 5,071,290 A | 12/1991 | Johnson |
| 5,089,038 A | 2/1992 | Kopco et al. |
| 5,152,233 A | 10/1992 | Spisak |
| 5,516,349 A | 5/1996 | Bouthillier |
| 6,875,248 B1 * | 4/2005 | Shelton ................ B01D 46/002 55/341.1 |
| 7,156,889 B1 | 1/2007 | Swanson et al. |
| 7,438,736 B1 | 10/2008 | Grey |
| 8,702,849 B2 | 4/2014 | Matson |
| 2003/0177744 A1 | 9/2003 | Gerakios et al. |
| 2007/0151971 A1 * | 7/2007 | Petzitillo, Jr. ........ B65D 88/126 220/1.5 |
| 2010/0150544 A1 * | 6/2010 | Koop ...................... G03B 9/08 396/453 |
| 2011/0120085 A1 | 5/2011 | Saito et al. |
| 2012/0304860 A1 * | 12/2012 | Matson ................ B01D 46/02 95/273 |
| 2013/0091811 A1 | 4/2013 | Morgan et al. |

\* cited by examiner

SYSTEMS AND METHODS FOR CONTROLLING PARTICULATE RELEASE FROM LARGE EQUIPMENT

CROSS-REFERENCE TO RELATED APPLICATIONS

This is a divisional of U.S. application Ser. No. 13/802,265, filed Mar. 13, 2013, which claims the benefit of U.S. Provisional Application No. 61/673,658, which was filed on Jul. 19, 2012; each of these applications are specifically incorporated by reference herein in their entirety.

FIELD

This disclosure is directed to methods and systems for reducing emissions and subsequent exposures to harmful particulates and, in particular, for controlling the release of harmful respirable particulates from large equipment.

BACKGROUND

Crystalline silica is a basic component of soil, sand, granite, and many other minerals. When reduced to respirable size particles, however, crystalline silica (including quartz, tridymite, and crystobalite) is a known human lung carcinogen and the mineral responsible for the lung disease silicosis. Respirable silica exposure is a serious concern for workers in industries that use silica sand and other silica-containing materials in their processing operations. For example, in the oil and gas industry, most new oil and gas wells are hydraulically fractured to stimulate well production. In these operations, silica sand is often used in combination with a fracturing fluid and large amounts of silica sand continually being filled and unloaded during these operations.

Certain vehicles that are used to move and transfer silica sand (i.e., sand movers, also called sand hogs, sand chiefs and sand masters) are not designed with occupational health considerations in mind; that is the machines are not configured with any means or mechanisms for containing, preventing or controlling the release of respirable size particles of silica and, as a result, significant quantities of respirable silica are released into workplace atmospheres, presenting a significant occupational health hazard for workers. Although personal respiratory protection (air-purifying respirators) are generally worn by workers, respirable dust containing crystalline silica is present in concentrations in the immediate vicinity of the sand movers that regularly exceeds the maximum use concentration for half-mask and sometimes for full-face air purifying respirators. Accordingly, there is a need to control primary emission sources to reduce the amount of respirable dust containing crystalline silica released during hydraulic fracturing and other similar operations that require moving large amounts of silica sand or other materials capable of generating and releasing potentially harmful particulates.

SUMMARY

In the embodiments disclosed herein, various containment systems and methods of using containment systems are disclosed. Such containment systems and methods of using the same can reduce the release of potentially harmful particulates from openings in equipment containing sand and other similar materials, including for example, sand moving trucks.

In one embodiment, a containment system for reducing the release of harmful respirable particles through surface openings in equipment that carries sand is provided. The system can include a filter-receiving member configured to be coupled and sealed over an opening in a top surface of the equipment and a filter member configured to be coupled to the filter-receiving member. The filter-receiving member has a first side, a second side, and a passageway extending from the first side to the second side. The filter has a porosity that permits air to flow through the filter member and restricts the flow of solid particulate, including respirable and non-respirable particulate.

In some embodiments, the passageway of the filter-receiving member transitions from a first profile on the first side to a second profile on the second side. For example, the first profile can be a square profile and the second profile can be a round profile.

In some embodiments, the filter member can have an open end that is sized to be coupled to the second side of the filter-receiving member. The filter member can include an elastic member at the open end, with the elastic member having a non-stretched diameter that is smaller than a diameter of the second end of the filter-receiving member. A recessed portion can be provided on the filter-receiving member, spaced away from the second end so that the recessed portion can receive the elastic member at the open end of the filter member, thereby securing the filter member to the filter-receiving member. In other embodiments, an external attachment member such as a band, strap, or clamp, can be provided and configured to secure the open end of the filter member to an external surface of the filter-receiving member.

The filter member can be a flexible bag filter. In some embodiments, the filter member is a tensioned accordion-style member that is collapsible inward in a generally predictable manner. The filter-receiving member can also include a hatch positioned at the second end of the filter-receiving member and the passageway of the filter-receiving member can be sized to receive the filter member when in a collapsed or detensioned configuration. In other embodiments, the filter-receiving member comprises a gate member that can be operable between an open position that permits various amounts of air to flow into the filter member and a closed position that restricts or completely occludes the flow of air into the filter member. In some embodiments, the filter-receiving member comprises a strikeplate for causing vibrations in the filter-receiving member.

In another embodiment, a method is provided for securing a particle containment system on a top surface of a truck containing sand. The method can include sealing and securing a filter-receiving member to an opening in the top surface of the truck and attaching a filter member to the filter-receiving member. The filter-receiving member can have a first side, a second side, and a passageway extending from the first side to the second side and the filter member can have a porosity that permits air to flow through the filter member and restricts the flow of solid particulates.

In some embodiments, the passageway of the filter-receiving member transitions from a first profile on the first side to a second profile on the second side and the act of securing the filter-receiving member causes the opening in the top surface of the truck to change from the first profile to the second profile. The first profile can be a square profile and the second profile can be a round profile. In other embodiments, the act of attaching the filter member to the filter-receiving member comprises positioning an open end of the filter member over the second side of the filter-receiving member. The filter member can include an elastic member at the open end and the filter-receiving member can include a recessed portion, and the act of attaching the filter member to the filter-receiving member can include stretching the elastic member to a diameter that can fit over the second end of the filter-receiving member and positioning the elastic member into the recessed portion. In other embodiments, the act of attaching the filter member to the filter-receiving member comprises securing an external attachment member such as a band, strap, or clamp, to the open end of the filter member and an external surface of the filter-receiving member.

In some embodiments, the method includes collapsing the filter member into the filter-receiving member and closing a hatch over the filter-receiving member for transport storage and from protection from certain elements including snow, ice and in some cases rain. In other embodiments, the method can include opening a gate member on the filter-receiving member to restrict volumes of air flow to the filter member. In other embodiments, the method can include striking a strikeplate on the filter-receiving member to vibrate the filter-receiving member and reduce buildup of materials on the round profile and to some degree the filter-receiving member.

The foregoing and other objects, features, and advantages of the invention will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, the term "filter" or "filter member" refers to a device that removes solid particulates, such as silica dust and other small particles, from air by permitting air to flow through the filter or filter member and restricting the flow of solid particulates therethrough. As used herein, the term "respirable" means particles with a mass median aerodynamic diameter (MMAD) of less than 10 microns in diameter. The term non-respirable, as used herein, means particles with a MMAD greater than 10 microns in diameter.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernible, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

As used herein, terms of degree, such as "generally" and "substantially" refer to the structures or methods as described or claimed, and also include those structures and methods that approximate the same. When numerically appropriate, these terms refer to difference that involve plus or minus 10% of the number noted. For example, unless otherwise stated (explicitly or implicitly), if two lengths are considered "generally" or "substantially" the same, the lengths are within 10% of one another.

As discussed above, workers in the vicinity of sand moving trucks and other similar equipment can be exposed to a high degree of potentially harmful particulates including respirable particulates. At hydraulic fracturing operations, for example, hundreds of thousands of pounds of sand are used as a proppant (to hold open cracks, fissures and fractures in the geological intersticies of a gas or oil well formation) for each stage of any hydraulic fracturing job. Hydraulic fracturing jobs can include up to 40 or more stages per well, so millions of pounds of sand are transferred from sand movers to other machines such as blender trucks. As a result, large quantities of respirable silica (e.g., alpha quartz) containing dusts are released into the workplace atmosphere when sand transfer trucks are refilled on site (also called "hot loading"). Depending on the number of wells at a worksite, refilling (hot loading) can occur as little as several times a day to almost on a continuing basis. Much of this silica dust is released from openings (e.g., "thief hatches") located on top of the sand moving trucks.

The methods and systems described herein exploit the inherent pressurization (in a range of 10-15 pounds per square inch) that occurs in sand movers during pneumatically driven refill operations. Exploiting pressurization inherent in the sand bins can be used to inflate containment systems allowing a filter cake to form allowing mechanical filtration to occur which can substantially control the release of silica dust and other small particles from large equipment. In particular, in some embodiments, novel containment systems are provided that can be sealed and secured to thief hatches or other surface openings on equipment configured for transporting silica sand and other materials. Such containment systems can restrict the release of potentially harmful particulates from the equipment and significantly reduce workplace (and potentially community) exposure levels for respirable particulates.

Figure 1A:
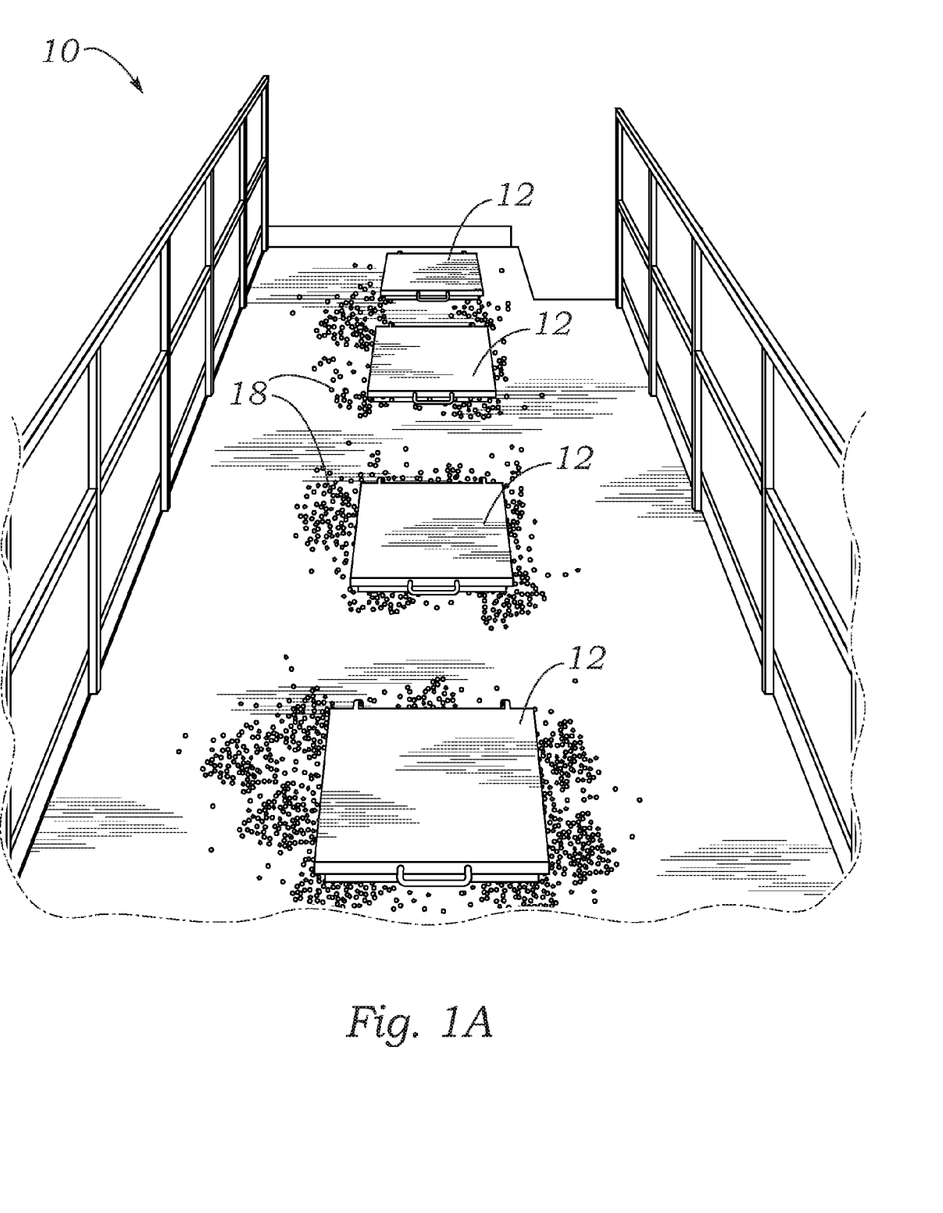
FIG. 1A illustrates a partial view of a top surface of equipment for transporting sand or other similar materials and having a plurality of hatches, such as a sand moving truck.
Figure 1B:
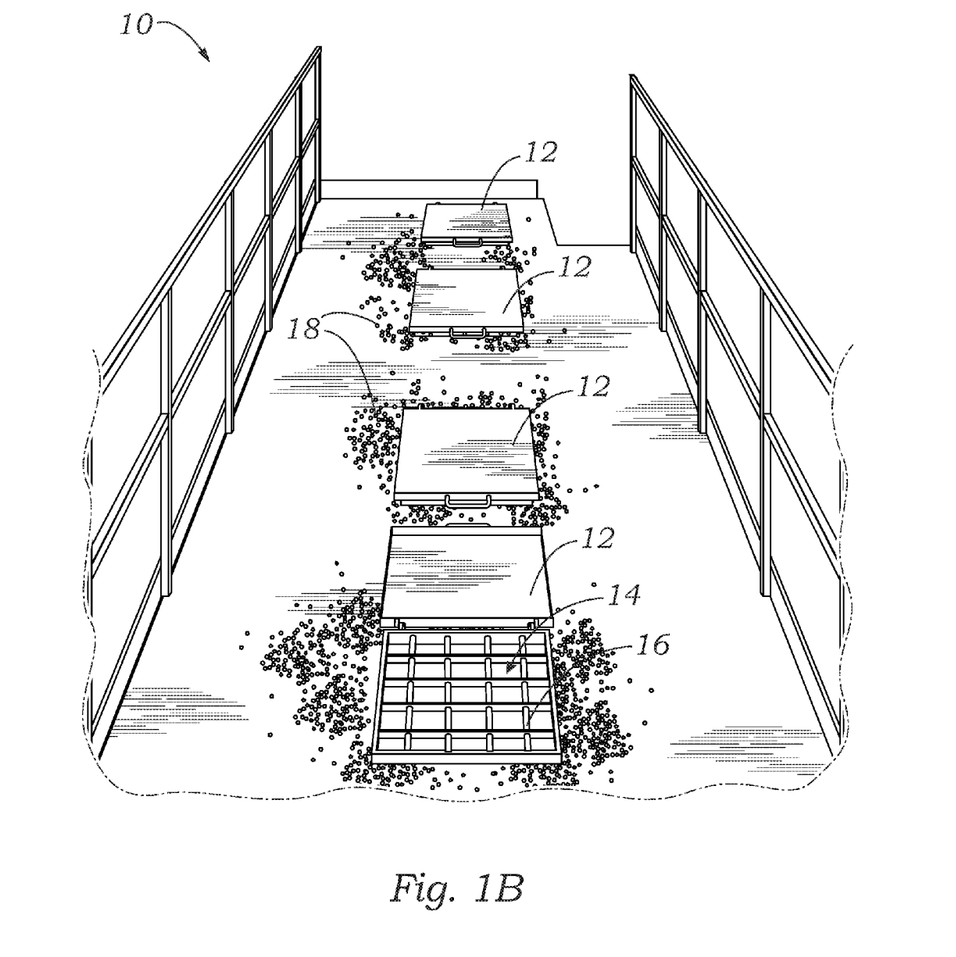
FIG. 1B illustrates a partial view of a top surface of equipment for transporting sand or other similar materials shown with a hatch in an open position.

FIG. 1 illustrates a partial, top perspective view of a sand transfer truck 10. Sand transfer truck 10 has a plurality of hatches 12 operable between a closed position (as shown in FIG. 1A) and an open position (as shown in FIG. 1B). Although FIGS. 1A and 1B illustrate a specific number and location of hatches 12 on sand transfer truck 10, it should be understood that the number and location of hatches 12 can vary without departing from the scope of the invention.

As shown in FIG. 1B, hatch 12 can be moved to an open position exposing an opening 14 in a surface (e.g., a top surface) of sand transfer truck 10. If desired a grate 16 can be provided to restrict access to opening 14 when hatch 12 is in the open position. As shown in FIGS. 1A and 1B, materials 18 within sand transfer truck 10 (e.g., sand and other particulate matter) can be released from within sand transfer truck 10 when hatches 12 are in the open position or even when hatches are closed as hatches are typically not configured with seals to prevent the release of particulates as considerations to occupational health are not part of the design parameters of sand movers.

Figure 1C:
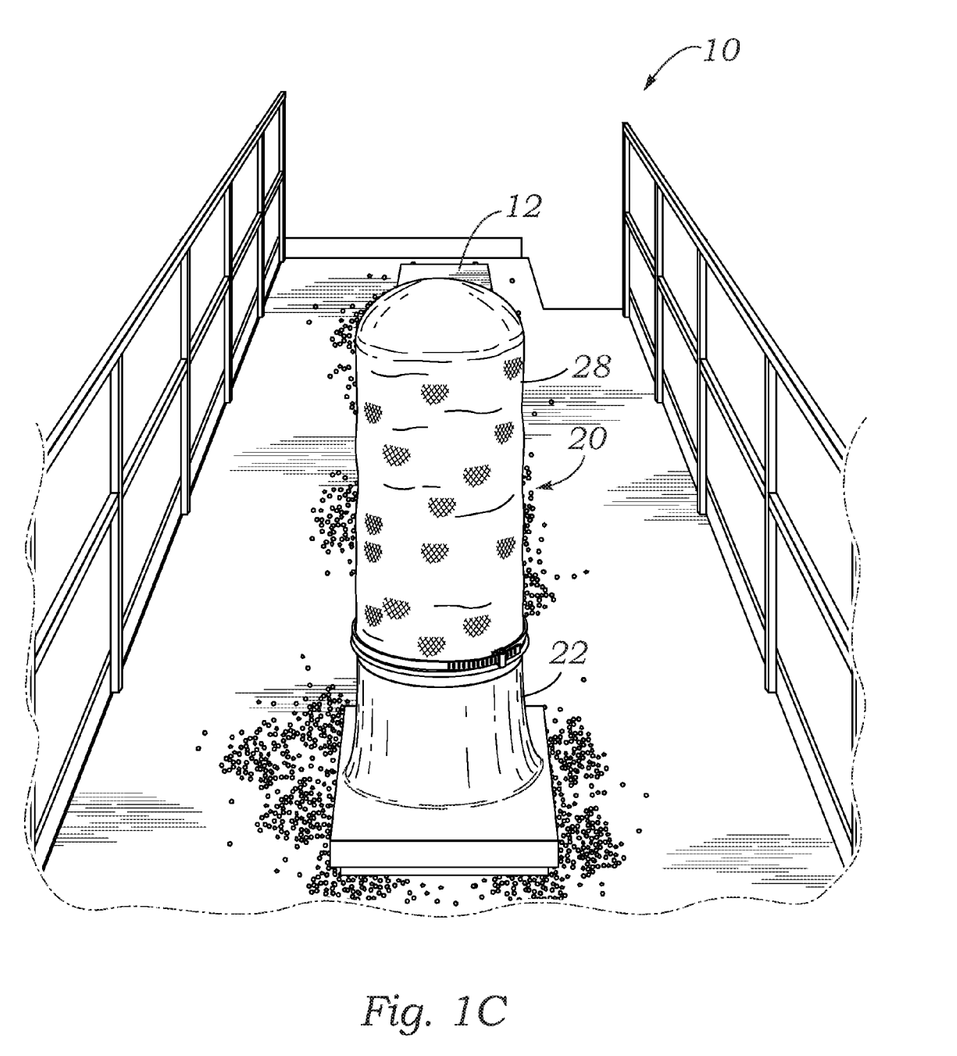
FIG. 1C illustrates a partial view of a top surface of equipment for transporting sand or other similar materials shown a containment system in operation.

FIG. 1C illustrates another partial, top perspective view of a sand transfer truck 10. A particulate containment system 20 is positioned on the top surface of sand transfer truck 10 over one of the openings 14 to seal and restrict the flow of materials from inside sand transfer truck 10 through opening 14.

Hatches 12 can be opened and configured with containment systems 20 when loading sand transfer trucks with sand. As discussed in more detail below, containment systems 20 can have filter members 28 that permit air from within the sand transfer truck 10 to flow out the filter member, but restrict particles of sand from passing therethrough. As such, the containment systems can reduce the release of silica dust (and other small respirable particles) through hatches 12. In addition, because air flow is permitted through the filter members, containment systems 20 can prevent over-pressurization of the inside areas (e.g., bins) of sand transfer truck 10. Thus, fill operators need not be as concerned about over-pressurizing the bins when adding sand. In some embodiments, one or more pressure relief valves and/or rupture disks can be provided to prevent over-pressurization within the bins. For example, a pressure relief valve can be positioned on a square-to-round transition flange to prevent pressure buildup. This can be especially useful when a gate member is provided as described in some embodiments below.

Figure 2A:
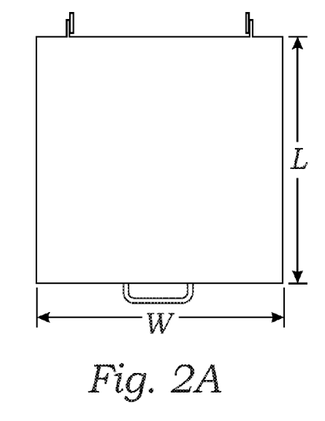
FIGS. 2A and 2B illustrate views of a hatch provided on a top surface of equipment for transferring sand or other similar materials.
Figure 2B:
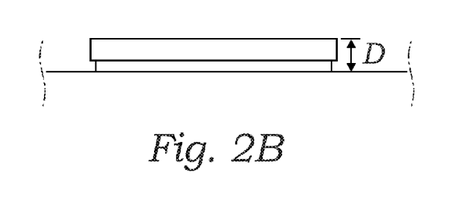

FIGS. 2A and 2B illustrate top and side views of a hatch 12. Although the size and configuration of hatch 12 can vary, the width W and length L are generally between about 15 and 30 inches (and more specifically, between about 20 and 24 inches). In some cases, the width and length can be the substantially the same, creating a generally square profile. As shown in FIG. 1C, hatch 12 can extend from the top surface of the sand transfer truck 10 by a distance D.

Figure 3:
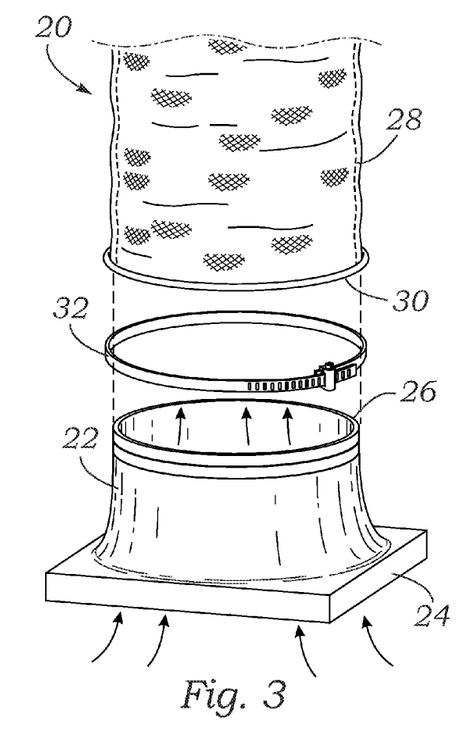
FIG. 3 illustrates a partial exploded view of a containment system for reducing the release of potentially harmful particulates from within equipment for transferring sand or other similar materials.

As shown in FIG. 3, containment system 20 can include a filter-receiving member 22 that is configured to be secured over opening 14. Filter-receiving member can have a first end 24 that is coupled to a surface of the top of sand transfer truck 10 and a second end 26 that is configured to receive a filter member 28. The filter has a porosity that permits air to flow through the filter member and restricts (e.g., by capturing and/or otherwise containing) the flow of solid particulate, including respirable and non-respirable particulate. The filter member can be sized based on the air flow rate through the hatch. Air flow rates ($ft^3$/min) to filter member surface area ratios ($ft^2$) can generally range from 5:1 to 15:1, with higher ratios possible with suitable filter member material.

Filter-receiving member 22 can be configured to be secured over an opening 14 when hatch 12 is open. In some embodiments, the filter-receiving member can be built into the hatch. For example, a quick-connect bag can be fastened directly to the hatch providing a robust seal on the hatch.

Alternatively, hatch 12 can be removable and filter-receiving member 22 can be secured over opening instead of hatch 12. Filter-receiving member can be coupled to the surface of sand transfer truck 10 in various manners, depending on whether the hatch is removed or not. For example, it can be mounted using clamping devices and/or other mechanical fastening means such as bolts, straps, bars, rod, toggle levers, spring-loaded pins, clips, etc. If desired, a gasket or similar compressible material (e.g., a rubber mat) can be positioned between the filter-receiving member 22 and a surface of sand transfer truck 10 to provide an air seal to restrict movement of fine particulates from the baseplate and the hatch opening perimeter, additionally this allows for a more secure coupling (e.g., substantially leak-free) between the two elements.

In some embodiments, filter-receiving member 22 can have a profile that varies along its height. For example, as shown in FIG. 3, filter-receiving member 22 can have a square to round transition. Other transitions are possible depending on the shape of the opening 14 and the shape of the open end 30 of filter member 28. For example, some other possible transitions can be as square to oval, rectangular to round, rectangular to square, etc. In addition, filter-receiving member 22 can have a height that sets second end 26 above the surface of sand transfer truck 10 to make it easier to secure and remove filter members 28 on and off of filter-receiving member 22.

Filter member 28 can comprise an open end 30 that is configured to be coupled to second end 26 of filter-receiving member 22. Open end 30 of filter member 28 can be coupled to filter-receiving member 22 in various ways, including external attachment members (e.g., devices that surround and/or otherwise secure the two elements together) and internal attachment members (e.g., devices that are integral with one or both of the two elements to secure them together).

FIG. 3 illustrates filter member 28 secured to filter-receiving member 22 via an external attachment member that is a screw clamp 32. In this embodiment, open end 30 is placed over an outside surface of second end 26 of filter-receiving member 22, and screw clamp 32 is placed over the portion of open end 30 that overlaps with the second end and tightened, thereby securing filter member 22 to filter-receiving member 22. Other options include straps and spring-loaded lever clamps.

In some embodiments, filter-receiving members can be configured so that a plurality of filter-receiving members can be stacked together (either with or without a collapsible filter member received thereon) for shipment and/or storage when not in use.

Figure 4:
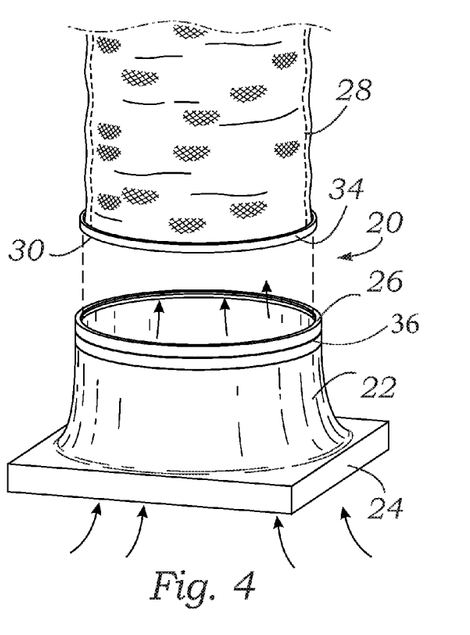
FIG. 4 illustrates another partial exploded view of a containment system.

FIG. 4 illustrates another embodiment in which open end 30 of filter member 28 comprises an internal attachment member that is an elastic member 34 (e.g., a snap ring or spring steel band) that is capable of stretching to fit over the surface of second end 26 of filter-receiving member 22. To further secure elastic member 34 to second end 26, second 26 can have a recessed portion 36 (e.g., a recessed lip) that has a reduced diameter so that elastic member 34 can contract to a smaller diameter within recessed portion, thereby securing filter member 28 to filter-receiving member 22.

Figure 5A:
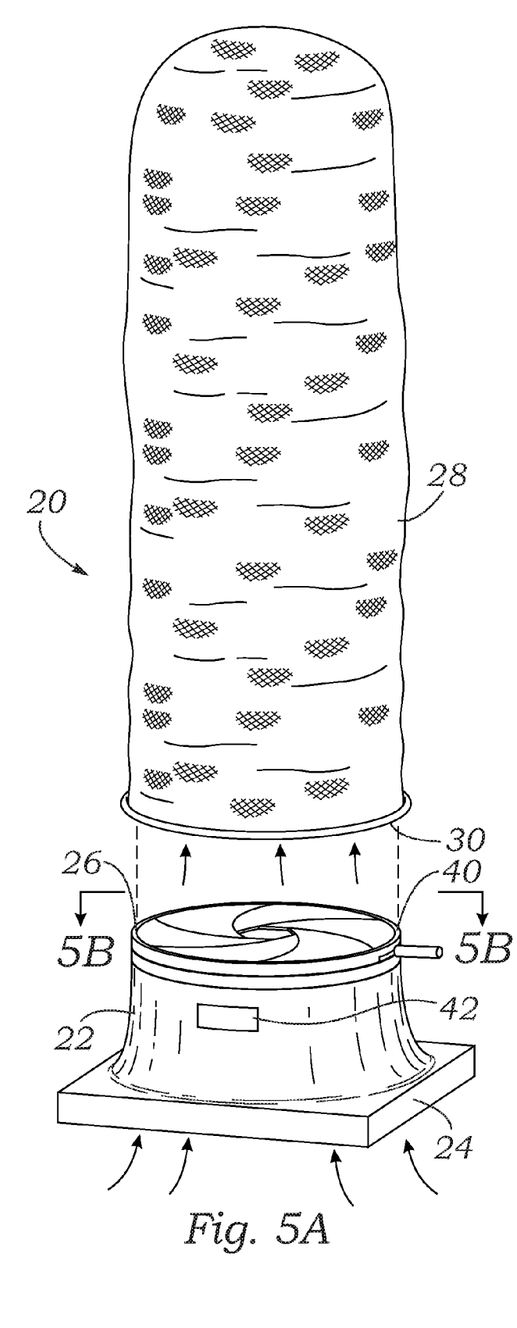
FIG. 5A illustrates another exploded view of a containment system.
Figure 5B:
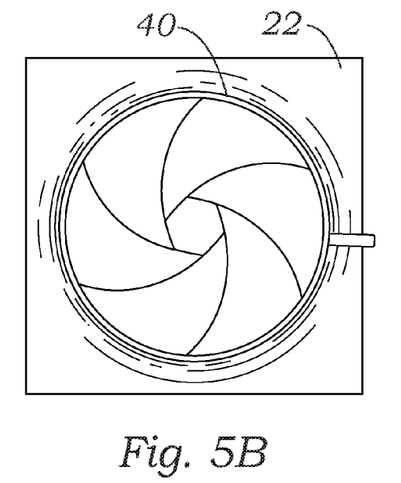
FIG. 5B illustrates a cross-sectional view taken along line 5B-5B in FIG. 5A.

In some embodiments, a gate member 40 can be provided to restrict access between the opening 14 and filter member 28. In some embodiments, gate member 40 can be on or near the filter-receiving member 22 to restrict materials from inside sand transfer truck 10 from passing through filter-receiving member 22. FIGS. 5A and 5B illustrate an embodiment wherein the gate member comprises an iris damper that is configured to move between an open and closed position (and, if desired, other positions therebetween as shown in FIG. 5B). Gate members may be useful to restrict flow in various situations. For example, if several bags are in place and only one bin is being filled, it may be useful to close the gate members on one or more openings. In addition, some systems connect all the bins through a sandmover's body which allows air movement from bin to bin. If only one bin were to be filled, you might want to close gate members in other bins to retain velocity pressure into the bag containing the dust in the bin being filled. In some embodiments, the gate members (or other orifice limiting members) can be configured to partially close their respective openings, thereby restricting air flow into the filter without overpressurizing the bin.

Figures 6A, 6B:
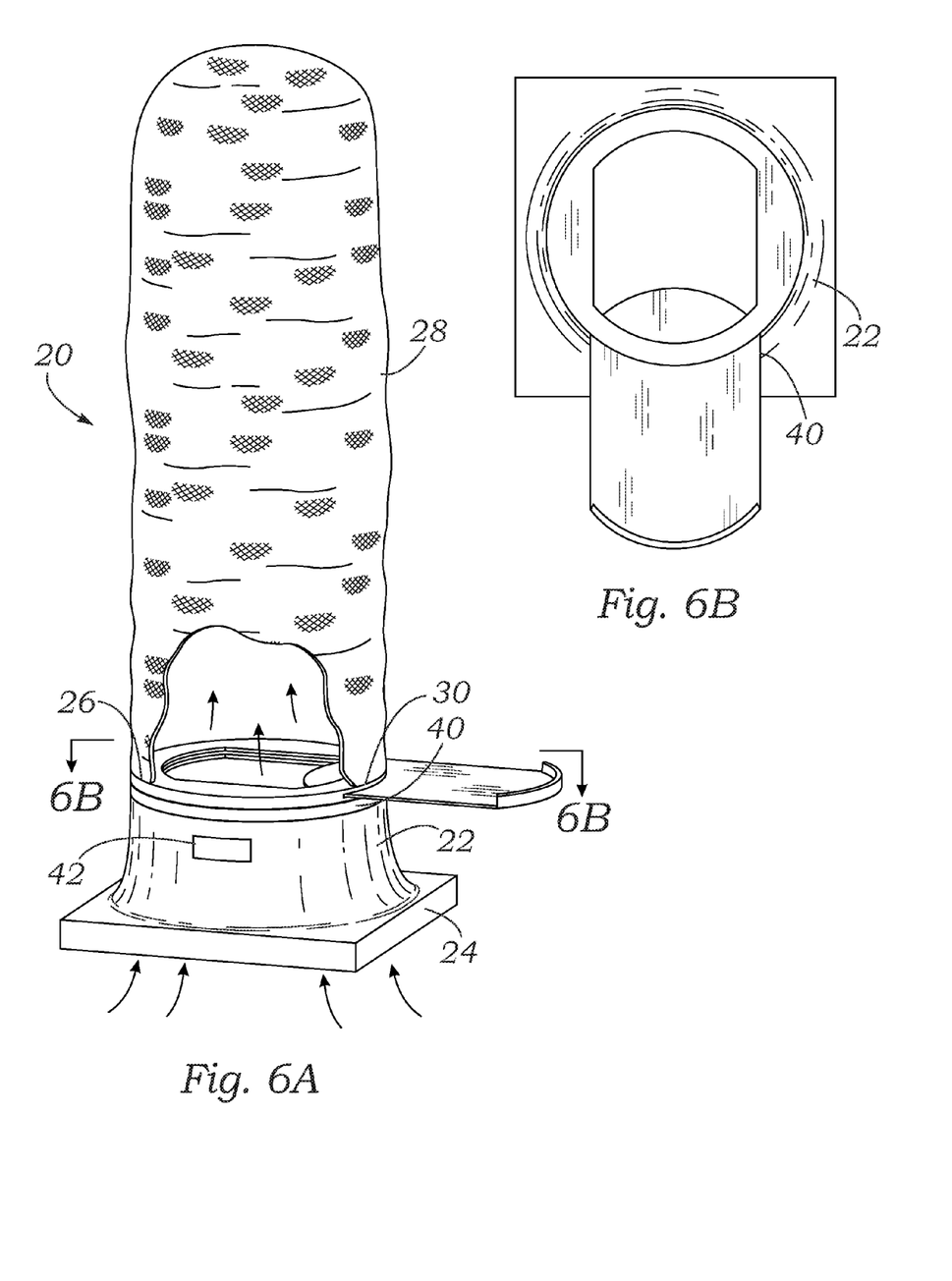
FIG. 6A illustrates another exploded view of a containment system.
FIG. 6B illustrates a cross-sectional view taken along line 6B-6B in FIG. 6A.

FIGS. 6A and 6B illustrate another embodiment in which gate member 40 comprises a sliding gate design that can move from a closed position to an open position (and, if desired, other positions therebetween).

In some circumstances, materials can build up or accumulate in the vicinity of the filter-receiving members and/or gate members. Accordingly, it can be desirable to provide a mechanism to reduce these accumulations of materials. In this regard, filter-receiving member 22 can comprise a strikeplate 42 or other surface to which a force can be applied to cause vibrations in the filter-receiving member 22 and/or gate members 40. Such vibrations can cause the accumulations or build-up to disaggregate and fall back into the inside of sand transfer truck 10.

In some embodiments, filter member 28 comprises a flexible member such as a fabric bag that is capable of moving freely after being secured to filter-receiving member 22. Since the large equipment disclosed herein are capable of movement (e.g., vehicles that can move when transferring sand or other materials), in some cases, the movement of the vehicle can be used to help maintain the functioning of the filter members. For example, because filter member can be flexible and movable relative to the sand transfer truck 10, filter member 28 can flap about when sand transfer truck 10 is moving, thereby causing build-up inside filter member 28 (e.g., dust cakes or other aggregate) to be broken up. However, preferably the hanging assembly and other elements (e.g., filter member) would be pushed down into the receiving member and/or hatch for transport. By reducing build-up and other aggregate within filter member 28, the filtering action of the filter member 28 can be maintained.

In addition, by having a flexible filter member 28, the filter member 28 can be easily collapsed. Collapse of filter member 28 can help break up build-up within the filter member 28. Also, collapsing filter member 28 can allow filter member 28 to be pushed into opening 14 so that a hatch 12 can be closed with filter member 28 inside (see, e.g., FIG. 7B).

Figure 7A:
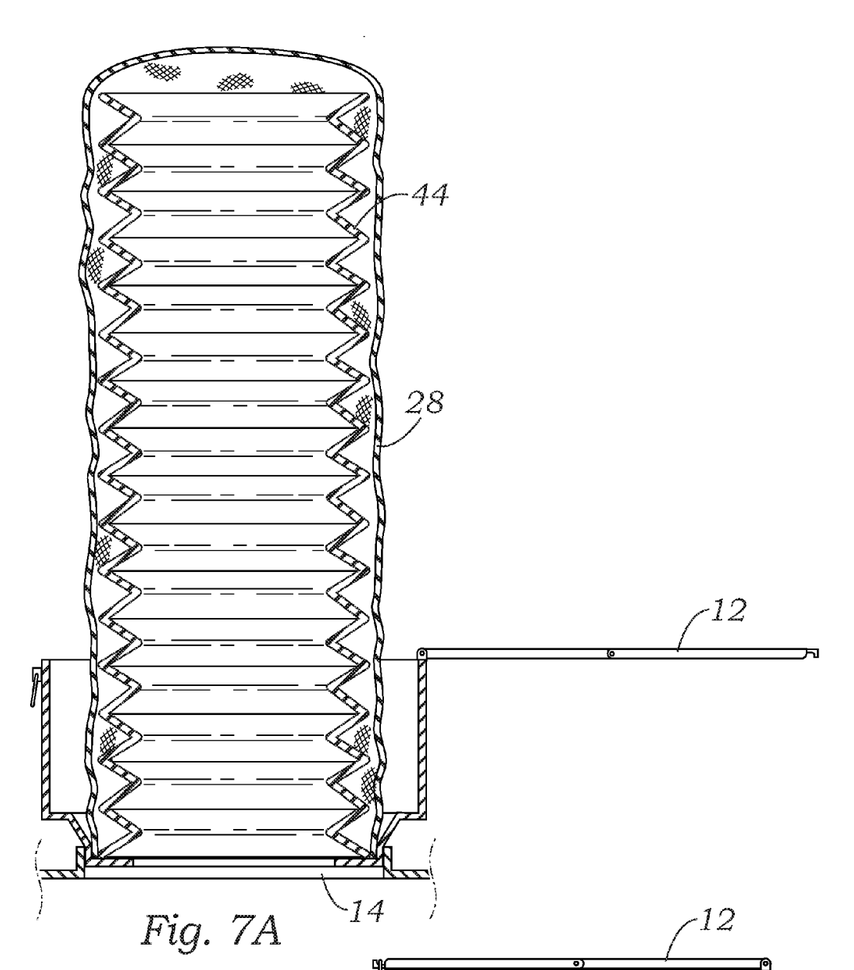
FIG. 7A illustrates a view of another containment system, shown in an expanded configuration.
Figure 7B:
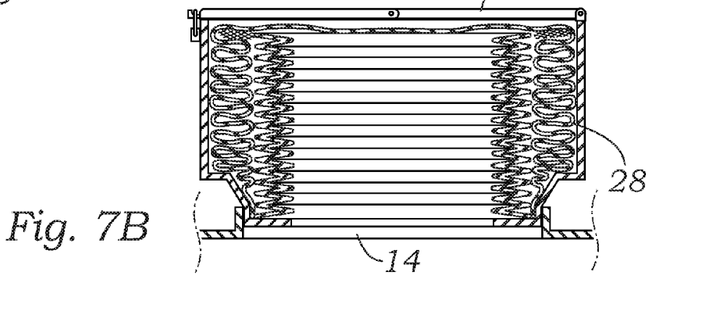
FIG. 7B illustrates another view of the containment system of FIG. 7A, but shown in a collapsed configuration.

In other embodiments, filter member 28 can comprise a material that is capable of achieve a predicable shape when collapsed. For example, as shown in FIGS. 7A and 7B, filter member 28 can be configured with an accordion-style pleated structure 44 and an internal coil spring that allows the filter member to collapse and retract in a predictable manner. As a result, structure 44 will shed any accumulated dust cake, reduce bunching of filter member 28 and permit automatic retraction of the filter member 28 for storage within receiving hatch 12. For example, as shown in FIG. 7B, filter member 28 can be collapsed and retracted and stored neatly within hatch 12 when not in active use allowing protection from the elements (rain, snow, ice) protecting the filter member from elemental exposure, ice build-up and wetting of filter fabric.

In some embodiments, a grounding device can be added to prevent buildup of static electricity and a hazard to the workers. The grounding device can comprise a strap or other similar structure (e.g., a flat braided copper wire). The device can run through the bag (e.g., it can be "sewn" into the bag). Alternatively, the device can be configured to ground the filter-receiving member, which will, in turn, ground the bag. In some embodiments, a hanging attachment device 50 (as shown in FIG. 8) coupled to the filter member 28 can help further ground the filter-receiving member 22 to dissipate a charge in the bag.

Figure 8:
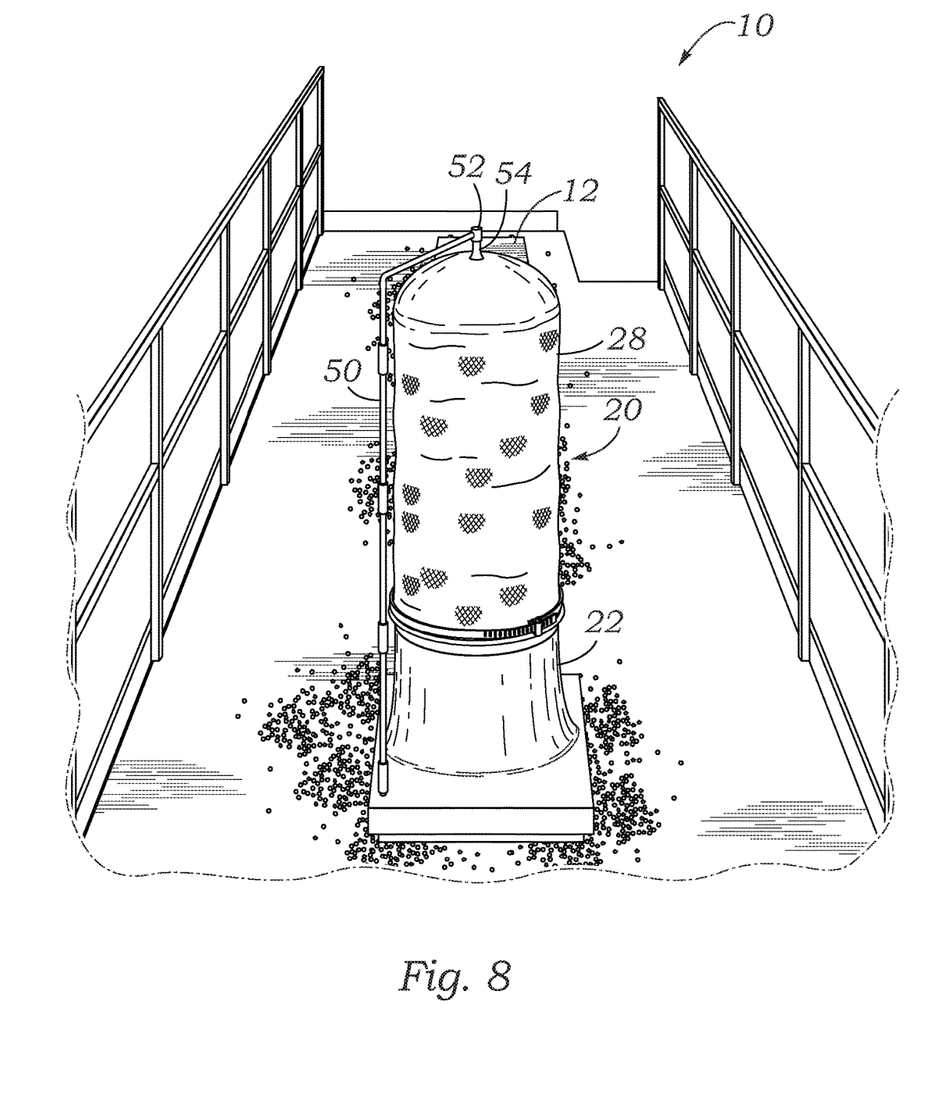
FIG. 8 illustrates a partial view of a top surface of equipment for transporting sand or other similar materials shown a containment system in operation.
Figure 9:
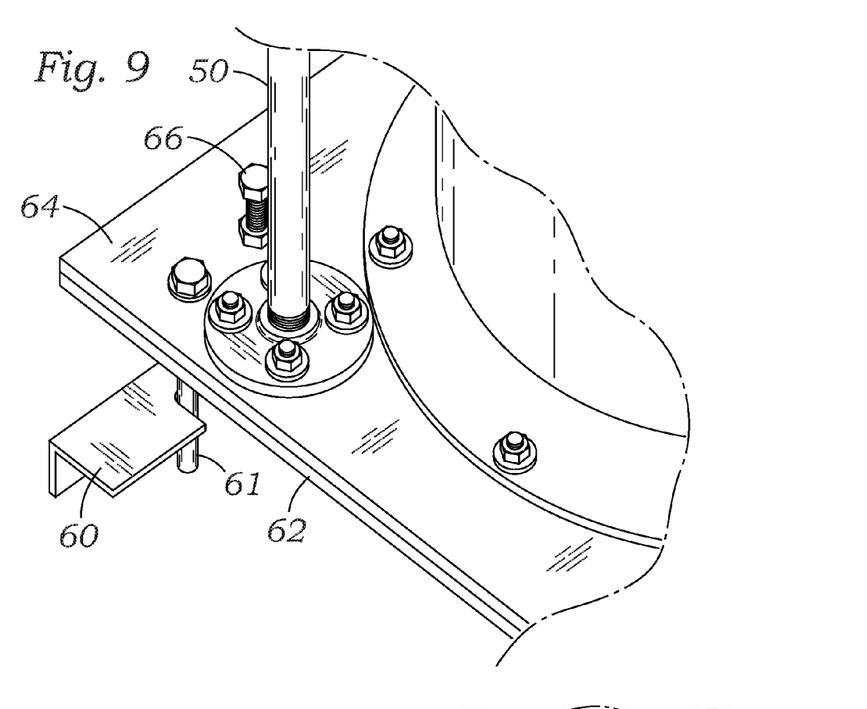
FIG. 9 illustrates a partial view of an attachment mechanism for a containment system.

As shown in FIG. 8, if desired, the filter member can be suspended from above using a hanging attachment device 50. For example, filter member 28 can have a first connecting member 54 (e.g., a loop, bolt, or other such coupling member) at the top of filter member 28 that can be secured to a second connecting member 52 (e.g., a clasp, threaded member, or other such connecting member) at the end of hanging attachment device 50 to suspend filter member 28 above the opening as shown in FIG. 8.

Hanging attachment device 50 can comprise any structure that is capable of extending from the base area of the system to suspend filter member 28 so that the member is held generally erect. The structure of the hanging attachment device 50 can be formed of metal and/or other structural materials capable of supporting the filter member, such as a composite material, wood, etc. During pneumatic fill operations of sand, the filter member 28 can be pressurized and depressurized, cycling the filter member through a flaccid and turgid state to dislodge an accumulated filter cake from the inside of the filter member 28, thereby preparing the filter member for subsequent filtration operations or cycles.

FIGS. 9-12 illustrate another attachment system for attaching the containment system to hatch openings of transfer vehicles. As shown in those figures, a plurality of securing mechanisms 60 are provided to secure the containment system 20 to a structure associated with a hatch opening. Securing mechanisms 60 have a rotatable member that can move, when placed adjacent to a thief hatch opening from a first unsecured position to a second secured position in which securing mechanisms restrict movement of the containment system relative to the transfer vehicle.

Figure 10:
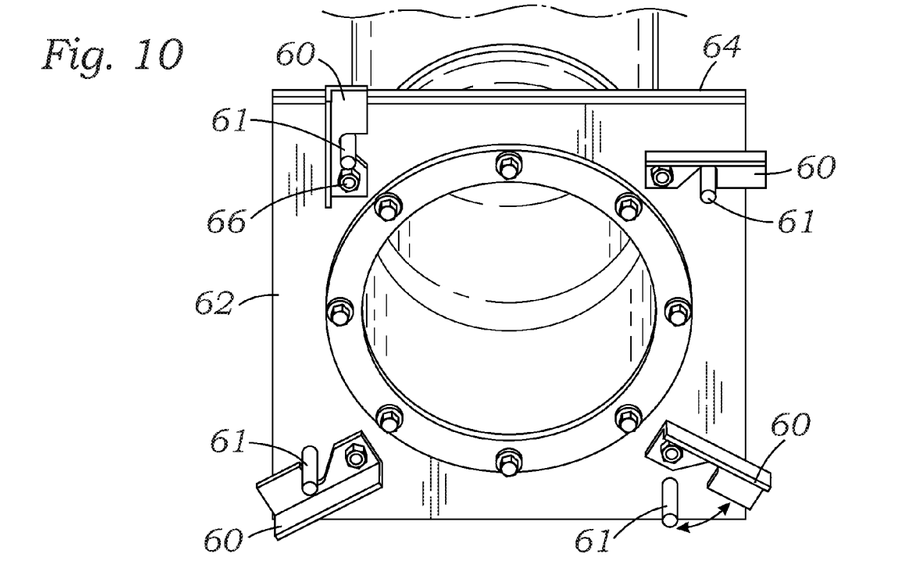
FIG. 10 illustrates another partial view of the attachment mechanism shown in FIG. 9.

Referring to FIG. 10, a plurality of securing mechanisms 60 are illustrated on a lower portion of the containment system 20. To secure the containment system 20 to a transfer vehicle, the system 20 can be placed over a thief hatch opening with the securing mechanism inside of the transfer vehicle. The rotation of securing mechanisms 60 causes that member to move underneath the structure of the truck adjacent the thief hatch opening so that the containment system cannot be removed from the thief hatch opening. The movement of the securing mechanisms can be restricted and/or controlled by various structures, such as motion-limiting member 61. As shown in FIG. 10, for example, securing mechanism 60 can have a slot or other groove to engage with motion-limiting member 61, thereby defining the amount of travel of the securing mechanism when it is moved.

In one embodiment, the system can include four securing mechanisms 60 (e.g., FIG. 10). However, it is contemplated that other numbers securing mechanisms may be used (e.g., more or fewer than four). In one embodiment, the securing mechanisms can comprise angle iron capture bars that are 2"×2"×3/16" steel meeting ASTM A36 standards.

A compressible member 62 can be positioned on a bottom surface of a base plate 64 of the containment system. The compressible member 62 contacts an upper surface of the transfer vehicle (adjacent the thief hatch opening) and permit a better seal between the containment system 20 and a surface of the transfer vehicle.

The base plate 64 can be formed of any suitable rigid material, such as steel. In some embodiments, the base plate can be less than 1 inch thick. In one embodiment, the base plate can be ¼ inch thick steel. The compressible member 62 can be any suitable compressible material, such as rubber. In one embodiment, the compressible member can also be less than 1 inch thick. For example, the compressible member can comprise ¼ inch thick adhesive backed, buna-N rubber, 40 A durometer.

The height of the securing mechanisms 60 can be adjusted by a height adjustment member 66. This permits an operator to adjust the amount of compression applied by the securing mechanisms 60 to the compressible member 62 and/or base plate 64. In FIGS. 9-12, the height adjustment member is illustrated as a threaded bolt system; however, it should be understood that other height adjustment systems can be utilized.

Although securing mechanisms 60 are illustrated with rotatable members, it should be understood that other moveable securing mechanisms can be provided. For example, instead of rotating, the securing mechanism can be a slidable member (e.g., like a deadbolt) that moves from a first unsecured position to a second secured position.

Figures 11, 12:
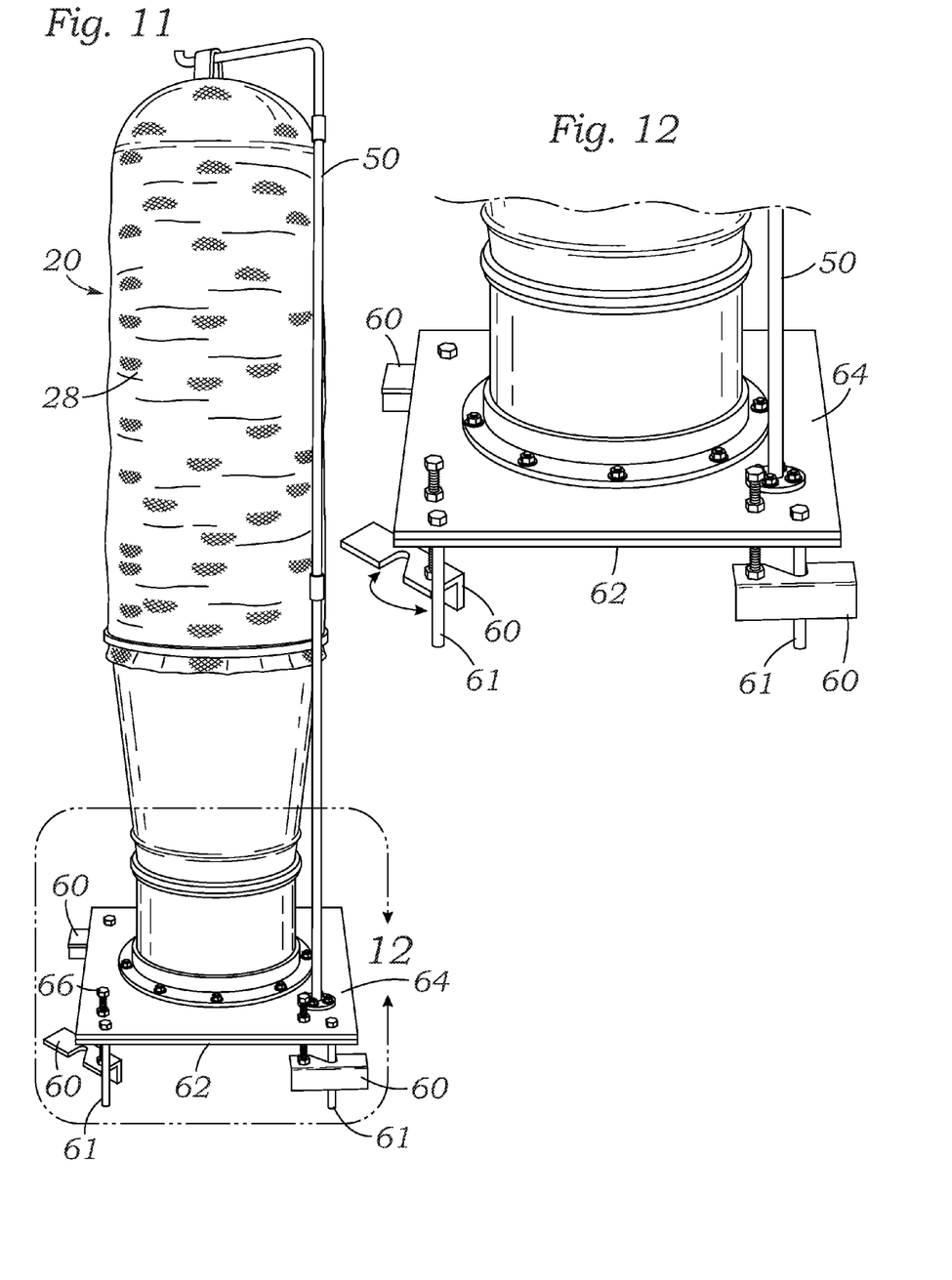
FIG. 11 illustrates a containment system having an attachment mechanism as shown in FIG. 9.
FIG. 12 illustrates another partial view of the attachment mechanism shown in FIG. 9.

The hanging attachment device 50 illustrated in FIG. 11 has a hook portion for receiving a loop from the containment system 20. As discussed elsewhere herein, device 50 can be formed of various materials, including for example, steel. In one embodiment, device 50 can comprise a ½ inch welded steel pipe.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of reducing the release of harmful respirable particles through at least one opening on a top surface of a truck containing sand in a bin of the truck, the method comprising:

securing a filter-receiving member to the truck at a location adjacent to the at least one opening in the top surface of the truck, the act of securing the filter-receiving member including positioning one or more securing members below the top surface of the truck and positioning a compressible material between the top surface of the truck and a portion of the filter-receiving member to create a seal that restricts the movement of harmful respirable particles between the top surface of the truck and the filter-receiving member, the filter-receiving member comprising a first side, a second side, and a passageway extending from the first side to the second side;

attaching a filter member to the filter-receiving member and a vertical support member such that it extends vertically upward from the top surface of the containment area in the vehicular equipment, the filter member with a porosity that permits air to flow through the filter member and restricts the flow of solid particulates;

opening a gate member between the filter-member and the bin to permit air flow to the filter member from the bin;

pressurizing the bin to form a filter cake on an inside surface of the filter member to improve mechanical filtration of the filter member; and cycling the filter member through pressurization and depressurization cycles to adjust an amount of the filter cake formed on the inside surface of the filter member.

2. The method of claim 1, wherein the passageway of the filter-receiving member transitions from a first profile on the first side to a second profile on the second side and the act of securing the filter-receiving member causes the opening in the top surface of the truck to change from the first profile to the second profile.

3. The method of claim 2, wherein the first profile is a square profile and the second profile is a round profile.

4. The method of claim 1, wherein the act of attaching the filter member to the filter-receiving member comprises positioning an open end of the filter member over the second side of the filter-receiving member.

5. The method of claim 4, wherein the filter member comprises an elastic member at the open end and the filter-receiving member comprises a recessed portion, and the act of attaching the filter member to the filter-receiving member comprises stretching the elastic member to a diameter that can fit over the second end of the filter-receiving member and positioning the elastic member into the recessed portion.

6. The method of claim 4, wherein the act of attaching the filter member to the filter-receiving member comprises securing an external attachment member to the open end of the filter member and an external surface of the filter-receiving member.

7. The method of claim 1, further comprising collapsing the filter member into the filter-receiving member and closing a hatch over the filter-receiving member.

8. The method of claim 1, further comprising striking a strikeplate on the filter-receiving member to vibrate the filter-receiving member and reduce buildup of materials on the filter-receiving member.

9. The method of claim 1, wherein the vertical support member comprises a hanging attachment that extends above the filter member and suspends the filter member from the hanging attachment.

10. The method of claim 1, wherein the one or more securing members are a plurality of securing members and act of securing the filter-receiving member comprises:
   positioning the plurality of securing members inside of the opening in the top surface of the truck; and
   moving the plurality of securing members from a first unsecured position to a second secured position, the secured position increasing an amount of pressure on the compressible member associated with a base plate secured to the filter-receiving member.

11. The method of claim 10, wherein the plurality of securing members are rotated from the first unsecured position to the second secured position.

\* \* \* \* \*